Oct. 1, 1957 O. WITTEL 2,808,456
OPTICAL BEAM SPLITTER SYSTEM FOR COLOR TELEVISION
Filed April 30, 1956
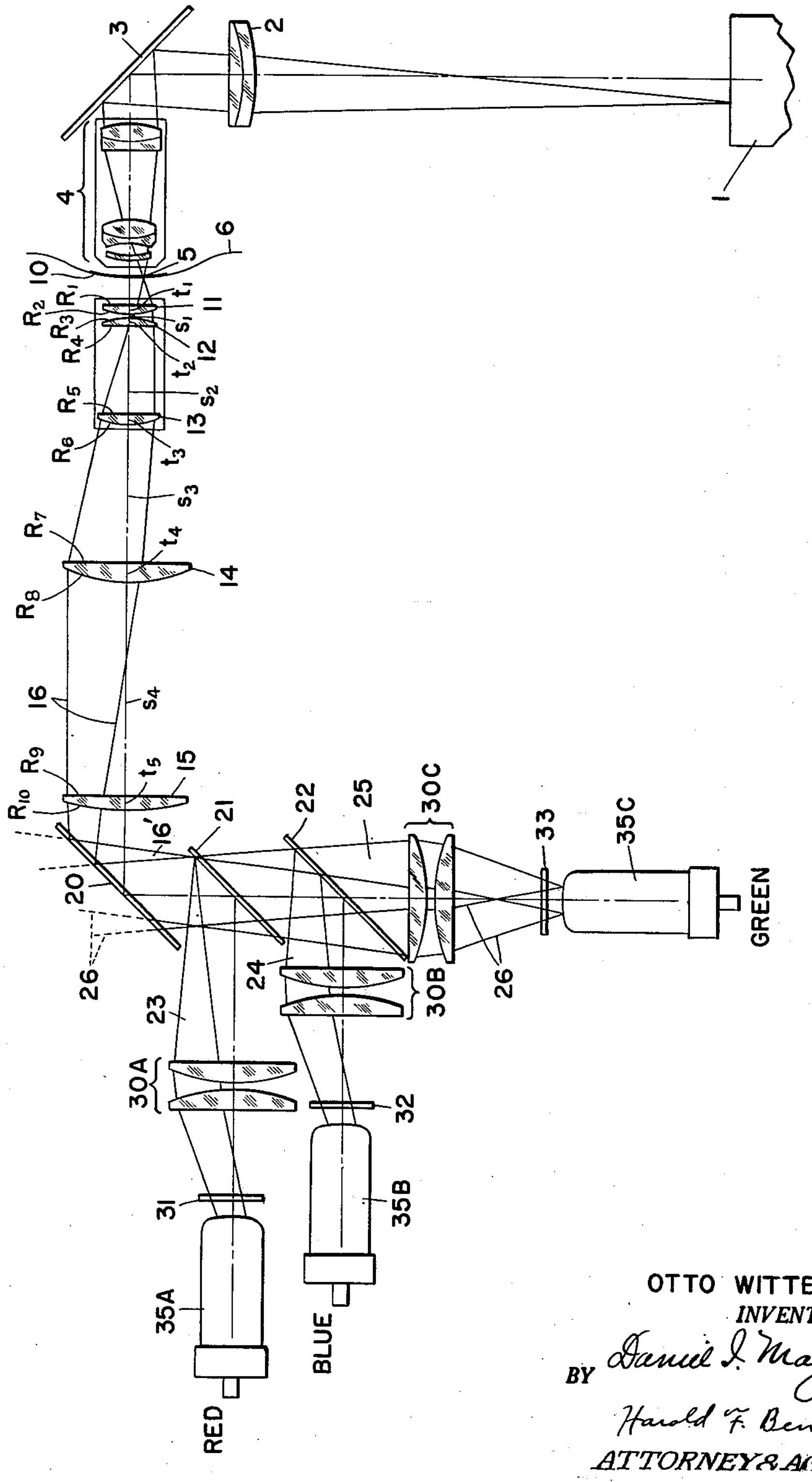
OTTO WITTEL
*INVENTOR.*
*BY* Daniel J. Mayne
Harold F. Bennett
*ATTORNEY & AGENT.*

United States Patent Office 2,808,456

Patented Oct. 1, 1957

2,808,456

OPTICAL BEAM SPLITTER SYSTEM FOR COLOR TELEVISION

Otto Wittel, Rochester, N. Y., assignor to Eastman Kodak Company, Rochester, N. Y., a corporation of New Jersey Application April 30, 1956, Serial No. 581,772

2 Claims. (Cl. 178—5.4)

The present invention relates to the scanning of motion picture film for color television transmission and for similar purposes and particularly to the combination of an optical system adapted to produce real images of an area of the film, a dichroic beam splitter and a plurality of photoreceptors.

It is an object of the invention to provide an optical scanning system for television in which the color values do not change from one part of the film gate being scanned to another.

It is a further object of the invention to provide a combination of an optical system, one or more dichroic interference reflectors, and two or more photoreceptors arranged in such a way that the image-forming light from one point in the film gate strikes substantially the same photosensitive area in each photoreceptor as does the light from any other point in the film gate, this light being out of focus at the receptor.

The invention is particularly useful in a television projector in which a highly corrected scanning system is used for illuminating one point of the film gate at a time and rapidly scanning the whole area of the film gate more than 20 times a second. When used for this purpose, the optical system of the invention picks up the light from the successive points scanned, divides it into two or more beams representing the component colors and collects each component beam onto a photoreceptor such as a photoelectric cell for generating signals corresponding to the color values in the image being scanned.

Selective reflectors are well known which depend upon the interference of light in thin films to reflect light of one color and to transmit light of another color. It is also known to use these beam splitters to break a beam of light up into its component colors, the most common system being to break it up into the three primary colors red, green and blue by means of two dichroic beam splitters, the first of which reflects one color and transmits the other two, and the second of which transmits one of the two remaining colors and reflects the other. Systems of this type have been used in three-color separation photography and they have the great advantage over the older combination of half-silvered mirrors and filters that the efficiency is much greater and also the boundary between two colors is more sharply defined.

Dichroic beam splitters as ordinarily used, however, have the disadvantage that the angle of incidence of the light changes from one side of the image area to the other resulting in a change in the effective thickness of the interference layers and hence in a change in the hue of each color component from one side of the picture to the other. Although attempts have been made to compensate for this in part by making the interference layers wedge-shaped, that is, thicker at one edge of the field than at the other so as to compensate in part for this variation in the angle of incidence, such wedge-shaped interference layers are expensive to produce and can only give an average or approximate color compensation.

Essentially the same practice has been followed in television systems as in color photography except that the image field is scanned point by point rather than being imaged all at once.

According to the present invention, a color television system is made up comprising a film gate, means for scanning the film gate area with a sharply focused spot of light, an optical system adapted to receive light from the illuminated spot on the film gate and to form a real image thereof, an interference type beam-splitting system optically aligned with and adapted to receive light from the optical system and to produce therefrom a plurality of differently colored beams of light and, in each of said differently colored component beams of light, a photoreceptor having a photosensitive area and a condenser lens adapted to concentrate the beam of light onto said photosensitive area, whereby the output of the photoreceptors represents the intensity of the respective component color of that point in the film gate which is illuminated at any given time.

The color television system according to the invention is characterized principally in two respects, first in that the optical system has an exit pupil which appears at infinity when viewed from the position of the dichroic beam splitter system and secondly that the condenser lens in each component beam images this exit pupil onto the effective photosensitive surface of the photoreceptor to avoid moving the light spot around from one part of the photosensitive surface to another as the scanning spot moves across the film gate and thereby to avoid variations in the output sginal arising from variations in sensitivity of the photosensitive surface. What is meant by the effective photosensitive surface depends on the construction of the photoreceptor; if the light is thrown directly upon the photosensitive surface of a photoelectric cell or photoconductive cell or the like, the surface itself is the effective surface but on the other hand if the light is thrown through a window into a cavity, part or all of the interior surface of which is photosensitive, then the window may become the effective photosensitive surface. Briefly, it is the surface at which the response is substantially independent of the angle of incidence of the light throughout a considerable range of angles.

A specific embodiment of the invention is shown in the accompanying drawing.

In the figure the film gate is shown at 10, the scanning system for illuminating the scanning spot on the film is shown to the right of the film gate in the drawing, the optical system according to the invention is shown between the film gate 10 and the 45-degree mirror 20, the dichroic beam splitter system is shown as two diagonal mirrors 21, 22 which divide the beam into three chromatically different beams 23, 24 and 25. In each component beam there is a condenser system 30A, –B or –C, concentrating the light onto the photoelectric cells respectively 35A, –B and –C.

Although the invention does not reside in the manner of or means for scanning the film gate with a spot of light, a preferred way of doing this is shown and described in more detail in my copending applications Serial No. 303,230, filed July 8, 1952, and Serial 434,135, filed June 3, 1954, the latter showing a preferred detail.

Briefly, this scanning illumination system operates as follows: A cathode ray tube 1 shown fragmentarily is scanned electronically in the customary way as practiced in television so that one point on the tube radiates light and the position of this point moves rapidly over the scanning path covering the face of the tube in about 1/60 of a second. In this connection, it is important to have phosphors with a very short excitation period and which either give out a fairly good white light, that is a fairly even distribution of spectral energy, or radiate peaks of intensity at or near the wavelength chosen for the primary colors into which the beam is finally divided.

Light radiated from the face of the cathode ray tube is received by a collimating lens 2, collimated, and passed along to a compensating mirror 3 and reflected into an objective 4 which is very highly corrected and concentrates the light onto a sharply focused spot 5 on the film gate 10. The mirror 3 represents a system of two or more compensating mirrors which intercept the light beam in cyclical succession, each mirror being tilted at a uniform angular rate to compensate for the uniform forward movement of the film 6 while the mirror intercepts the beam and then is moved laterally out of the beam when the next successive frame of the motion-picture film enters the gate so that the next successive mirror can be moved into the beam and be tilted while this next frame is moving through the film gate so as to compensate for its motion. A preferred form of the objective 4 is described in a copending application, Serial No. 588,345 filed May 31, 1956 by Willy Schade. Preferably the film gate is curved concave toward the objective to give the best correction of the keystoning error well known in optical compensating projectors.

The present invention relates primarily to the optical system made up of lenses 11, 12, 13, 14 and 15 axially aligned between the film gate 10 and the diagonal mirror 20 and to the condensers 30A, –B and –C. While it may be thought that a highly corrected image-forming system which forms a sharp image of the film at the dichroic beam splitter system is necessary, I have discovered that sharp imagery at this point is of no significance whatever and accordingly I have been able to use inexpensive optics. It may even be noted that the film gate is backward curving as viewed from the position of this relay optical system and that no attempt has been made to flatten the field of this system.

I have discovered that the feature of paramount importance is the positioning of the exit pupil of the system at infinity as viewed from the rear of the system, that is, as viewed from the position of the mirror 20, and the imaging of this pupil onto the effective sensitive surface of the photo-receiver. The aperture stop of this optical system is formed at the relay lens 13, and this lens is also the most effective one in imaging the scanning point, albeit not sharply, into the dichroic beam splitter system. The lenses 11, 12 adjacent the film gate may have some slight effect on the imaging of the spot but they operate primarily as field lenses for imaging the pupil of the objective 4 onto the relay lens 13. This is essential for light efficiency and it is even more essential for uniformity as the scanning spot moves in the film gate area. It may be observed that if the exit pupil of the objective 4 is imaged beyond or before the aperture stop of the lens 13, then the beam would only partly fill the lens 13 when the scanning spot is off the axis of the system.

Lenses 14 and 15 operate partly to assist lens 13 in focusing the image of the spot 5 into the dichroic beam splitter system but their primary purpose is to image the exit pupil of the lens 13 at infinity according to the invention. Probably systems could be designed in which one lens element performs the combined functions of lenses 14 and 15, but in meeting the dimensional requirements of certain more or less standard television equipment with which the system is to be used, I prefer to use two elements separated as shown.

The mirror 20 is a part of the standard television equipment just referred to and its purpose is to place the dichroic beam splitter system and the photoreceptors in a convenient location. Thus the optical system according to the invention delivers light to the dichroic beam splitter system 21, 22 but does not necessarily form a sharp image of the scanning spot 5. However, it does have its exit pupil at infinity. The importance of having this pupil at infinity will be discussed after describing the dichroic beam splitter system in more detail.

It is known, of course, that there are two-color, three-color and four-color systems of color renditions used in various arts and sciences, and my invention is advantageous in any of these systems when interference type dichroic beam splitter mirrors are used. The three-color system is generally preferred, however, and it is preferable to reflect the red and blue primary colors at the two dichroic mirrors 21, 22, and to permit the green primary color to be transmitted through both mirrors. One advantage of this as against a system in which the green is reflected is that only one sharp cutoff boundary is necessary in each of the dichroic mirrors, since, in most instances, a sharp boundary between the red and infrared or a sharp boundary between the blue and ultraviolet is not important. Accordingly, in the system shown in the diagram, the reflected light beam 16′ strikes the first mirror 21 and is divided, the red beam 23 being reflected into the condenser lens 30A which concentrates it onto the red receptor 35A while the transmitted beam proceeds to the second dichroic mirror where the blue component is reflected as beam 24 and the green component is transmitted as beam 25, after which these two beams fall on the condenser lenses 30B and 30C respectively which concentrate these beams onto the blue photoreceptor 35B and the green photoreceptor 35C.

The structure of the interference filters which make up the dichroic beam splitter is well known. It is also well known that the effective thickness of the different interference layers changes inversely as the cosine of the angle of inclination of the light rays in the layer under consideration. Thus if it were possible to have the interference mirrors normal to the beam or nearly normal to the beam, there would be very little variation in the cosine, but it is necessary to set the mirrors at an angle to the beam so as to separate the component beams 23, 24 and 25 in space, and because of the obliquity of the mirrors to the beam 16′, a variation in the angle of incidence has a much greater effect on changing the interference effect than the same variation in angle of incidence near normal. Accordingly, it is very important that the average angle of incidence of the light beam 16′ should be held constant within very narrow limits as the beam sweeps across the interference mirror during scanning.

A corresponding beam of light 26 associated with a scanning position on the opposite side of the axis is shown fragmentarily and extended through the mirror 20 in dotted lines. The left-hand boundary of this beam is parallel with the left-hand boundary of beam 16′ and the right hand boundary is parallel to the right-hand boundary thereof. Projecting these two beams to infinity, it may be seen that they both necessarily come from a pupil at infinity. Accordingly, by providing an optical relay system with its exit pupil at infinity, I have eliminated the variation of color in the action of the dichroic beam splitters whch has commonly occurred in the prior art as the scanning spot moves.

A further important feature of the invention lies in the cooperation of the condenser lenses 30A, –B, –C in the respective component color beams 23, 24, 25 with the relay system above described to image the exit pupil of the relay system onto the photoreceptors 35A, –B, –C. In the past, great difficulties have been encountered when the scanning spot has been focused onto the light-sensitive surface or even approximately focused thereon and false signals were generated due to variations in the sensitivity of the photoreceptive surface over its area and to the movement of the scanning spot image across this area and across these irregularities. These difficulties are avoided by focusing the exit pupil of the relay system onto the photocell so that a considerable area of the photosensitive surface is illuminated, something of the order of an inch in diameter, and making this area remain stationary as the scanning spot moves.

Color filters 31, 32 and 33 are optionally inserted into the individual beams for further modifying the color values and intensity thereof.

Constructional details for one specific embodiment of the invention are as follows:

| Lens | N | V | Radii, mm. | Thicknesses, mm. |
|---|---|---|---|---|
| 11 | 1.523 | 58.6 | $R_1=\infty$<br>$R_2=-55.0$ | |
| | | | | $t_1=8.5$ |
| | | | | $s_1=1.0$ |
| 12 | 1.523 | 58.6 | $R_3=+55.0$<br>$R_4=\infty$ | |
| | | | | $t_2=8.5$ |
| | | | | $s_2=74.7$ |
| 13 | 1.523 | 58.6 | $R_5=\infty$<br>$R_6=150.2$ | |
| | | | | $t_3=8.0$ |
| | | | | $s_3=116.0$ |
| 14 | 1.523 | 58.6 | $R_7=\infty$<br>$R_8=-117.5$ | |
| | | | | $t_4=14.5$ |
| | | | | $s_4=178.0$ |
| 15 | 1.523 | 58.6 | $R_9=\infty$<br>$R_{10}=-214.2$ | |
| | | | | $t_5=10.0$ |

In this table, the lens elements are numbered in the first column in order from front to rear, the front being at the film gate, the refractive index N for the "D" line of the spectrum and the conventional dispersive index V are given in the next two columns, and the radii of curvature R of the lens surfaces, the thicknesses $t$ of the lens elements, and the axial space $s$ between lens elements, each numbered by subscripts from front to rear, are given in the last two columns. The + and − values of the radii denote surfaces respectively convex and concave to the front. It will be noted that all the lens elements are made of an ordinary crown glass.

Each of the condenser lenses 30A, -B, -C is made up of two plano-convex elements of the same kind of glass spaced about a millimeter apart, the convex sides facing each other and having radii of curvature of about 120 mm.

Lens 11 is spaced 19 mm. from the film gate, and the condenser lenses are optically spaced about 300 mm. from lens 15. The photoreceptors are about 90 to 95 mm. from the condensers and are adjusted during assembly to the position of the pupil image. As designed, the pupil image is the image of surface $R_6$ formed by lenses 4 and 5 and the condenser in each beam.

The focal lengths of the individual elements is as follows:

$$f_{11}=105.2 \text{ mm.}$$
$$f_{12}=105.2 \text{ mm.}$$
$$f_{13}=286.8 \text{ mm.}$$
$$f_{14}=224.7 \text{ mm.}$$
$$f_{15}=409.6 \text{ mm.}$$
$$f_c=229.6 \text{ mm.}$$

In this list the focal lengths $f$ are numbered by subscripts to correspond to the lens elements and $f_c$ designates the focal length of one condenser element, the other being equal thereto.

This system is specifically designed to operate with the objective described in the copending Schade application mentioned above. If a different objective is used with a different exit pupil, the focal lengths of lens elements 11 and 12 should be chosen to image the pupil at lens element 13.

What I claim is:

1. An optical system for deriving color television signals from motion picture film comprising a film gate, means for scanning said film gate with a sharply focused spot of light, a lens system for receiving light from said film gate and forming an unsharp real image thereof, interference type beam splitter means optically aligned with said lens system for receiving the beam of light from said lens and splitting it into a plurality of differently colored beams, a plurality of condenser lens means and a plurality of photoreceptors, one of each in each colored beam, each condenser lens being adapted to concentrate its respective beam onto its respective photoreceptor, in which said lens system comprises a plurality of member lenses in spaced alignment and an aperture limiting means associated therewith, characterized in that at least one member lens is spaced from said aperture limiting means between the latter and said beam splitter, in that the portion of the lens system between said aperture limiting means and said beam splitter is adapted to form an image of said aperture limiting means at infinity constituting an exit pupil of said lens system, and in that each said condenser lens means is adapted to image said exit pupil substantially on the effective photo-sensitive surface of its respective photoreceptor.

2. Apparatus for scanning motion-picture film for color television transmission purposes comprising a film gate having an aperture for transilluminating an area of said film, optical means for scanning said area with an sharply focused spot of light, said light being directed from an exit pupil of said scanning means, a lens system adapted to receive light from said film area and project an image thereof at a finite distance, diagonally oriented sharp cutting selectively reflecting interference type beam splitting means adapted to reflect a component beam of said light of one color value and to transmit a second component beam of a different color value, a photoreceptor individually associated with each component beam and condenser lens means for concentrating each said component beam onto its respective photoreceptor, in which the lens system comprises a relay lens means and two field lens means, and aperture limiting means associated with said relay lens means, one of said field lens means being between said relay lens means and said film gate for imaging said pupil of said scanning means into said aperture limiting means and the second field lens means being axially aligned between said relay lens means and said beam splitting means and adapted to image said aperture limiting means at infinity whereby the average angle of incidence of said light on said beam splitting means is invariant during scanning, and each said condenser means being adapted to reimage said aperture limiting means onto the photosensitive surface of the photoreceptor individually associated therewith whereby the illuminated area of said photoreceptor remains stationary during scanning.

References Cited in the file of this patent

UNITED STATES PATENTS 2,658,102 Goldsmith ---------------- Nov. 3, 1953